SYSTEM FOR PROCESSING NRZ PCM SIGNALS

Filed Jan. 25, 1967

2 Sheets-Sheet 1

Inventors
MICHEL FRANCOIS BARJOT
ANDRÉ E. J. CHATELON
PIERRE GIRARD
By Alfred C. Hill
Agent

SYSTEM FOR PROCESSING NRZ PCM SIGNALS

Inventors
MICHEL FRANCOIS BARJOT
ANDRÉ E. J. CHATELON
PIERRE GIRARD
By Alfred C. Hill
Agent 3,537,100

SYSTEM FOR PROCESSING NRZ PCM SIGNALS

Michel Francois Barjot, Paris, André Edouard Joseph Chatelon, Montrouge, and Pierre Girard, Paris, France, assignors to International Standard Electric Corporation Filed Jan. 25, 1967, Ser. No. 611,747
Claims priority, application France, Feb. 9, 1966, 49,026
Int. Cl. G06f *5/00*
U.S. Cl. 340—347 9 Claims

ABSTRACT OF THE DISCLOSURE

The system determines the number of transitions in a non-return-to-zero (NRZ) code group having an associated guard time resulting in "0" when the number of transitions are less than a given value and "1" when the number of transitions are greater than the given value. With "0", the even digits of the code group are inverted increasing the number of transitions and "1" is inserted in the guard time. With "1," the code group is unaltered and "0" is inserted in the guard time. A filter responds to the transitions of these resultant code groups to provide synchronization. The binary condition in the guard time is detected and the resultant code groups converted to the original code groups.

BACKGROUND OF THE INVENTION

This invention relates to systems, such as data transmission or data processing systems, requiring synchronization between two components thereof employing PCM (pulse code modulation) signals and more particularly to such systems employing NRZ PCM signals.

For purposes of explanation, the invention will be described with respect to NRZ PCM data transmission systems employing a transmitter terminal or exchange and a receiver terminal or exchange having a number of regenerative repeaters therebetween. However, it is to be understood that the inventive system and techniques thereof are also applicable to data processing systems.

In NRZ PCM systems, the information is in the form of an n-digit binary code in serial relationship wherein regularly spaced contiguous time positions or digit time slots are occupied by a binary bit. That is, in the NRZ type code group there is no guard time between adjacent digits of the code group. Thus, two or more adjacent digits of binary condition "1" would stay at the "1" level and not return to "0" between the adjacent digits. This is in contrast to a return-to-zero technique of code modulation where the two or more adjacent digits in binary condition "1" would return to "0" between the adjacent binary "1" digits.

The NRZ code groups can be transmitted by modulating the amplitude of a carrier signal to a first level during the digit time in which a binary digit "1" occurs and to a second distinct level during a digit time in which a binary digit "0" appears. The characteristics of the NRZ type code modulation system and techniques are well known and are described in particular in an article entitled "Modulation and Coding" published in No. 4 of vol. 40 of "Electrical Communication."

The NRZ type of code technique has the advantage of reducing the bandwidth of the transmitted signal. However, there is an accompanying difficulty in extracting synchronization signals in the form of the transitions between binary "1" and binary "0" and the transitions from binary "0" to binary "1." It is known that in a regenerative repeater and a receiving terminal the signals received are reshaped and retimed on time positions defined by synchronization signals supplied, for instance, by a narrow band filter tuned to the repetition frequency of the digit pulses and which is energized in the NRZ type of modulation by signals corresponding to the above-mentioned transitions in both directions between the two binary conditions. However, as mentioned in the article noted hereinabove the amplitude of these signals and their phase vary in accordance with the density of the transitions in the received signals with this density becoming smaller in NRZ code signals as the digits transmitted comprise a series of identical digits.

SUMMARY OF THE INVENTION

An object of this invention is to modify the NRZ code groups transmitted to facilitate the restitution of the synchronization signal constituted by transitions between the two binary conditions.

Another object of this invention is to modify the NRZ code groups to provide code groups having a number of transitions between the two binary conditions equal to or higher than a given number of transitions N so that when the entire train of code groups is considered the transitions tend towards a constant number.

Still another object of the present invention is to modify NRZ code groups in a manner to have as constant a number of transitions as possible for energizing a narrow band filter to extract the synchronization signal.

A feature of this invention is the provision of a system for processing a train of a plurality of *n*-digit NRZ code groups having a guard time between adjacent ones of the NRZ code groups comprising a first means coupled to a source of NRZ code groups to produce a control signal for each of the NRZ code groups, each of the control signals being dependent upon the number of transitions between the two binary conditions within the corresponding one of the NRZ code groups, and second means coupled to the source and the first means responsive to each of the control signals and the corresponding one of the NRZ code groups to convert each of the corresponding one of the NRZ code groups to a predetermined code group to produce a train of predetermined code groups having a greater number of transitions than the train of NRZ code groups to provide synchronization information.

Another feature of this invention is the provision, in addition to the first and second means above mentioned, of third means coupled to the second means responsive to the transitions of the train of predetermined code groups to abstract the synchronization information and fourth means coupled to the second means to convert each of the predetermined code groups to the corresponding one of the NRZ code groups.

BRIEF DESCRIPTION OF THE DRAWINGS

The above mentioned and other features and objects of this invention will become more apparent by reference to the following description taken in conjunction with the accompanying drawings, in which.

DESCRIPTION OF THE PREFERED EMBODIMENT

Figure 1:
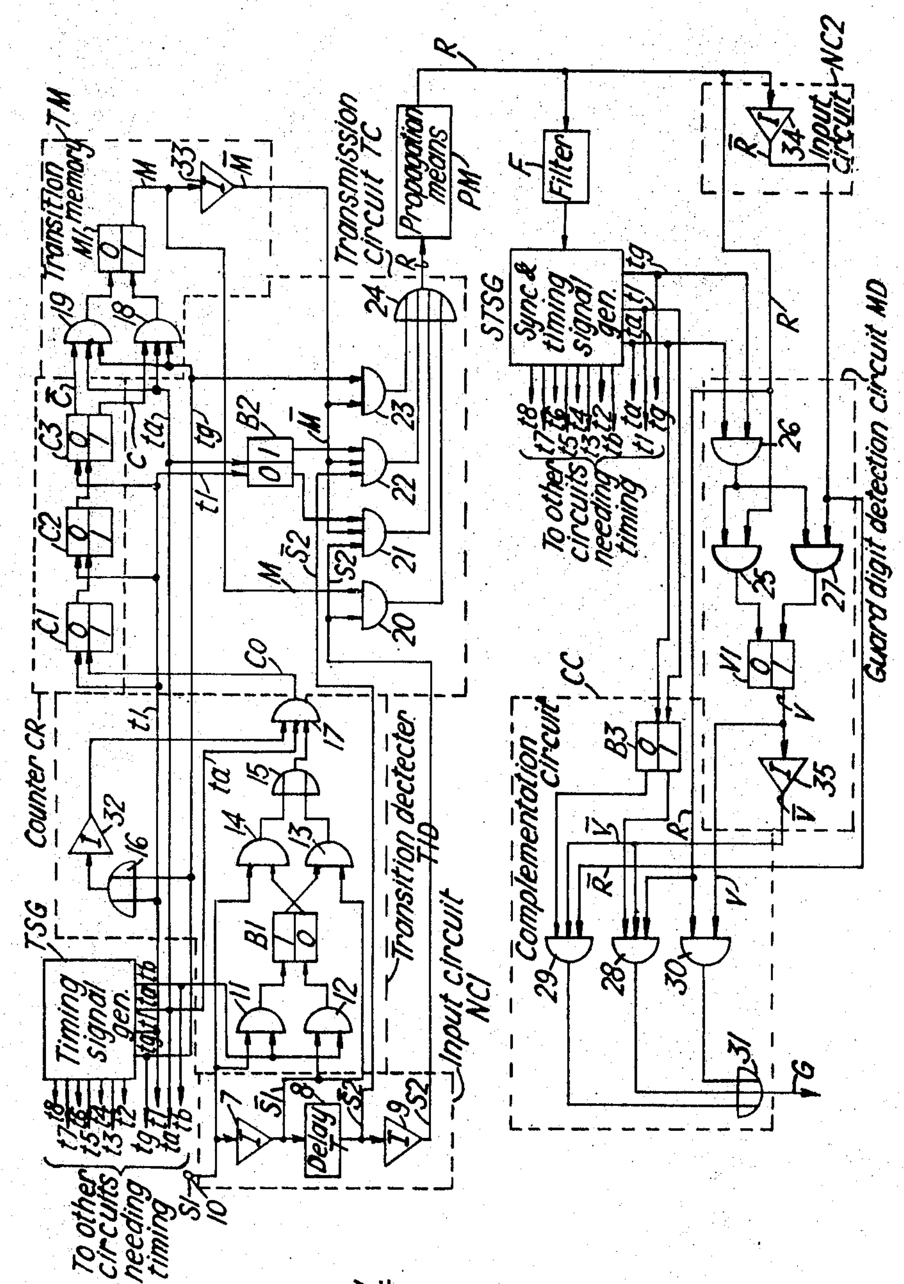
FIG. 1 is a schematic block diagram of a system in accordance with the principles of this invention.

In order to simplify the description of the logical operations taking place in the system of FIG. 1, the logical algebraic notations as set forth in the books "Logical Design of Digital Computers" by M. Phister (J. Wiley—publisher) and "Arithmetic Operations in Digital Computers" by R. K. Richards (D. Van Nostrand Co.—publisher) will be employed.

Figure 2:
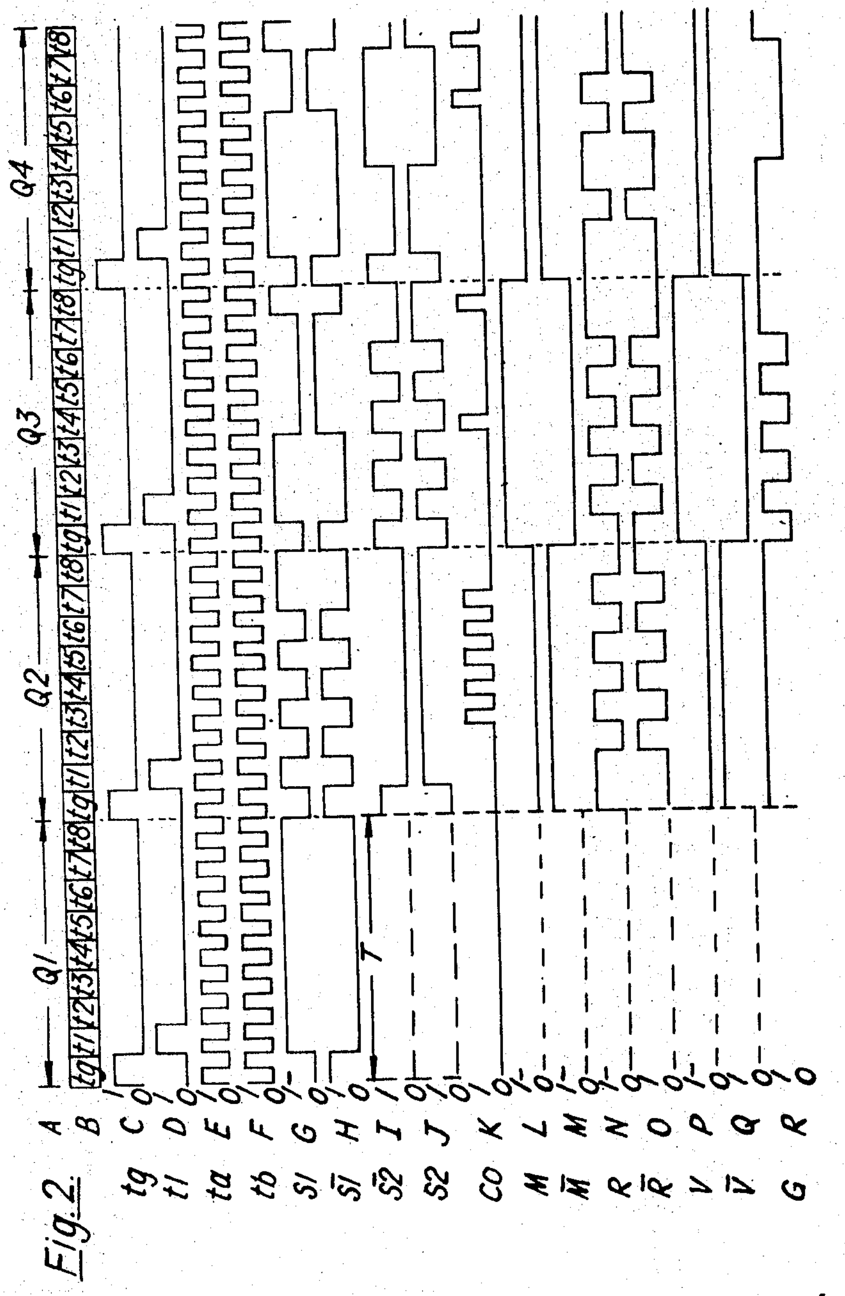
FIG. 2 is a series of timing curves useful in explaining the operation of the system of FIG. 1.

For purposes of explaining the operation of the embodiment of the system in accordance with this invention, as illustrated in FIG. 1, certain assumptions are made, as illustrated in FIG. 2. The input signal S1 (curve G, FIG. 2) illustrates four NRZ code groups received successively at terminal 10 of FIG. 1 having different code combinations. These four code groups are referred Q1, Q2, Q3 and Q4 in curve A, FIG. 2. It is assumed that the code combinations are expressed in a non-redundant binary code comprising eight digits occupying eight digit time slots referenced *t*1, *t*2 . . . *t*8 (curve B, FIG. 2) and a guard time *tg*. Each of the digit time slots are divided into two basic time slots *ta* and *tb* defined by the timing pulses illustrated in curves E and F, FIG. 2. Curces C and D, FIG. 2 illustrate the timing signals *tg* and *t*1 and curves E and F, FIG. 2 illustrate the timing signals *ta* and *tb* which are employed in the system of this invention. All of the timing signals defining the various time slots are supplied by timing signal generator TSG, illustrated in FIG. 1.

The system of FIG. 1 includes input circuit NC1 coupled to terminal 10 which receives the input code groups S1 (curve G, FIG. 2). Terminal 10 is coupled to an inverter 7 to provide the complementary signal S1, curve H, FIG. 1. Delay 8 is coupled to inverter 7 and has a time delay T equal to the digit time slots *t*1, *t*2 . . . *t*8 plus the guard time slot *tg* and provides at the output thereof S2, curve I, FIG. 2. The output of delay 8 is coupled to inverter 9 and provides at its output the signal S2, curve J, FIG. 2.

Transition detector TD is coupled to terminal 10, the output of inverter 7 and appropriate ones of the timing signals from generator TSG, as illustrated, to supply at each transition from binary condition "1" to binary condition "0" and from binary condition "0" to binary condition "1" a signal C*o*. Counter CR is coupled to the output of detector TD to count the detected transitions and to provide an output from flip flop C3 identifying whether the number of transitions in a given code group is lower or higher than a given value N with the output $\overline{C}$ indicating that the number of transitions are lower than N and an output C indicating that the transitions are higher than N. To the output of counter CR is coupled a transition memory TN in which the state of flip flop C3 is stored and supplies a signal M or $\overline{M}$ during the time reserved to the processing of the code group in the transmission circuit TC.

Circuit TC receives the delayed signals S2 and $\overline{S2}$ and provides at its output a signal R which is either the signals S2 during the odd digit time slots (*t*1, *t*3, etc.) or the signals $\overline{S2}$ during the even digit time slots (*t*2, *t*4, etc.) when memory TM supplies a signal $\overline{M}$. If circuit TC receives from memory TM signal M, signal S2 is applied directly without modification to the output thereof to form the output signal R.

A propagation means PM transmits the signal R to equipment requiring synchronization wherein filter F detects the transitions in signal R and the resultant output thereof is applied to the synchronization circuitry for timing signal generator STSG. The, thusly, received synchronization signals, supplied by filter F, synchronizes the timing signals of generator STSG for reshaping and retiming the digits of the signals on well defined time positions. Thus, through the cooperation of filter F the receiving portion of a regenerative repeater or receiving terminal enables the identification without ambiguity of the different digit time slots of a code group. This operation is called "framing" in the case of time division multiplex PCM transmission and numerous circuits fulfilling this function have been described in the literature and such a circuit has been described in French Pat. No. 1,301,275. The framing operation enables the timing signals to be in exact synchronization with the received signals, that is, the signal *tg* is produced when the guard time of the code group is received, signal *t*1 when the first digit of the code group is received and so forth.

Signal R is also received by input circuit NC2 and supplies the signal R directly and the signal $\overline{R}$ through means of inverter 34. The output from circuit NC2 is applied to the guard digit detection circuit MD along with appropriate timing signals from generator STSG, as illustrated. Circuit MD supplies a signal V when the guard time includes binary condition "0" and a signal $\overline{V}$ when the guard time includes binary condition "1." The presence of signal $\overline{V}$ indicates that the even digits of the code combination must be complemented while the presence of a signal V means that the digits of the code combination are not modified. A complementation circuit CC coupled to circuit MD and receiving appropriate timing signals from generator STSG, as illustrated, carry out the instructions received from circuit MD to provide at the output terminal of circuit CC a signal G in accordance with the instructions contained in the signals V and $\overline{V}$.

To provide a better understanding of the system of this invention, the operation oft he system will now be described with respect to code group Q1 and code group Q2. It will be noted from curve G, FIG. 2 that the received signal S1 has a binary "0" in each guard time *tg*.

Considering first the code combination Q1, it is observed that the eight digit time slots are occupied by a continuous series of pulses at binary condition "1." This code combination is coupled to AND gate 11 along with timing pulse *tb*. AND gate 12 has also applied thereto timing pulse *tb* and signal S1 at the output of inverter 7. It will be observed that AND gate 17 during time slots *tg* and *t*1 will never pass a signal to its output since the timing pulses *tg* and *t*1 are coupled through OR gate 16 and inverter 32 to provide a binary "0" at the input of AND gate 17. At time *tb* in time slot *t*2 AND gate 11 will provide an output which will set flip flop B1 into the "1" condition which is applied to AND gate 13 with a "0" condition being applied to AND gate 14. The "0" condition from flip flop B1 prevents an output from AND gate 14 while the "0" condition of S1 prevents an output from AND gate 13 and thus no output from OR gate 15 or AND gate 17. This condition will persist in time slot *ta* of time slot *t*3 since flip flop B1 will stay in the position it was set in at time slot *tb* of time slot *t*2. The above conditions will continue during time slots *t*4–*t*8 resulting in a C*o* output having a binary condition "0" as illustrated in curve K, FIG. 2.

Flip flops C1, C2 and C3 of counter CR are set to their "0" condition at time *t*1. With a "0" C*o* output, flip flops C1, C2 and C3 will remain in the condition they were set at time *t*1 resulting in a binary "1" for output $\overline{C}$ and a binary "0" for output C.

During the guard time *tg* of code group V2, AND gates 18 and 19 of memory TM are being energized by the timing signals *ta* and *tg*. With a "1" output from the "0" portion of flip flop C3, AND gate 19 will provide an output which will set flip flop M1 to its "0" condition resulting in a signal M having a binary "0." Through means of inverter 33 the $\overline{M}$ signal is provided for application along with signal M to the circut TC.

Circuit TC includes flip flop B2 which is set at time *t*1 to its "0" condition and at each succeeding time slot is alternately switched by the timing signal *ta* so that flip flop B2 is in the "0" state during odd digit time slots and in the "1" state during even digit time slots. The "1" output of flip flop B2, signal $\overline{S2}$ and signal $\overline{M}$ are coupled to AND gate 22. The "0" output of flip flop B2, signal $\overline{M}$ and signal S are coupled to AND gate 21 while signal S and signal M are coupled to AND gate 20. AND gate 23 has coupled thereto timing signal *tg* and signal $\overline{M}$. The outputs from these various AND gates are coupled to OR gate 24 to provide the signal R at the output thereof.

Continuing with the operation of the modification of the Q1 code group, it will be seen that at time *t*1 the "0" output of flip flop B2 is in condition "1" thereby priming AND gate 21. Since $\overline{M}$ is also in condition "1" and signal S2 is also in condition "1," AND gate 21 will provide a "1" digit in time slot *t*1. At time slot *ta* in time slot *t*2, flip flop B2 is set to provide a "1" condition at its "1" output thereby priming AND gate 22. Since signal $\overline{M}$ and $\overline{S2}$ is in a "0" condition and all the other AND gates 20, 21 and 23 have at least one "0" input the digit appearing in time slot 2 of signal R will be in condition "0." The alternating condition of flip flop B2 and the conditions of the various signals applied to the AND gates 20, 21, 22 and 23 will produce digits of binary "1" condition in odd time slots and digits of binary "0" condition in even time slots, as illustrated in curve N, FIG. 2. It will be noted in curve N, FIG. 2 that the guard time slot *tg* has a binary "1" condition therein. This condition is provided by AND gate 23 which has coupled thereto the timing signal *tg* and signal $\overline{M}$ resulting in an output from AND gate 23 and, hence, an output from OR gate 24.

Signal R is then propagated by means PM with the transition thereof being detected by filter F for synchronization of generator STSG. Signal R is also applied to circuit NC2.

Circuit MD includes AND gate 26 which provides an output therefrom during time slot *ta* of time slot *tg*. This output is coupled to AND gates 25 and 27. AND gate 25 has coupled thereto signal R and AND gate 27 has coupled thereto signal $\overline{R}$. These two AND gates determine the binary condition present in the time slot *tg*. Since the time slot *tg* of signal R is in "1" condition, an output will be produced from AND gate 25 which sets flip flop V1 in its "0" condition resulting in a signal V having a binary condition "0" and a signal $\overline{V}$ in a "1" condition as illustrated in curves P and Q, FIG. 2.

These two signals from circuit MD coupled to circuit CC which includes therein flip flop B3 actuated by timing signals *t*1 to set flip flop B3 in its "1" condition at the start of the code group and a timing signal *ta* which alternates the "1" and "0" conditions from the "1" and "0" output of flip flop B3. Circuit CC further includes three AND gates 28, 29 and 30 to complement the even numbered digits in signal R when the binary condition in the guard time so designates and an OR gate 31 coupled to these three AND gates to provide the output signal G. Still considering code group Q1 it is seen that in time slot *t*1 signal R is in the "1" condition and signal $\overline{V}$ is also in the "1" condition. In addition the "1" output of flip flop B3 is in the "1" condition. Thus, AND gate 28 will be activated to provide an output having a "1" condition for passage through OR gate 31. In time slot *t*2, it is seen that signal R is in the "0" condition, signal $\overline{R}$ is in the "1" condition while $\overline{V}$ is in the "1" condition. At this time flip flop B3 has been switched by timing signal *ta* to provde a "1" condition from the "0" output thereof and a "0" condition from the "1" output thereof. Under these conditions AND gate 29 will pass an output to OR gate 31 having a condition "1."

The above operation will continue for the remaining time slots of the code group Q1 producing the same sequence of eight binary digits in condition "1" for signal G (curve R, FIG. 2) as was present in the input signal S1 (curve G, FIG. 2).

Let us now consider the operation of the system for code group Q2. As before detector TD produces no output *Co* in time slots *tg* and *t*1 due to the input to AND gate 17 from OR gate 16 and inverter 32. At time slot *t*2, signal $\overline{S1}$ will cause AND gate 12 to produce an output setting flip flop B1 in its "0" condition resulting in a "1" output to AND gate 14 and a "0" output to AND gate 13. This condition of flip flop B1 will continue until time slot *tb* in time slot *t*3. Thus, at time slot *ta* of time slot *t*3 there will be provided an output from AND gate 14 which is coupled through OR gate 15 and, hence, through AND gate 17 to produce a pulse output for signal *Co*. This operation of detector TD will continue until all transitions in the code group Q2 are detected as illustrated in curve K, FIG. 2.

As before, counter CR has each of its flip flops C1, C2 and C3 set to their "0" condition at time *t*1. The advance pulses for counters CR are produced by signal *Co*. The first three pulses of signal *Co* will not change the condition of flip flop C3 but the fourth pulse will change the condition of flip flop C3 so that output C has a binary "1" condition and output $\overline{C}$ has a binary "0" condition. At time *ta* of time *tg*, AND gate 18 will provide an output which will set flip flop M1 into its "1" condition producing a signal M having a binary "1" condition as illustrated in curve L, FIG. 2.

Circuit TC controlled by signals M and $\overline{M}$ and the output of flip flop B2 will be set forth hereinabove with respect to code group Q1. However, the binary condition of M and $\overline{M}$ have changed and in affect cause an operation of AND gates 20, 21 and 22 to produce an output identical to the delayed input signal S2. In other words there is no complementation of even code digits since the number of transitions is greater than the given number of transitions N. AND gate 23 operated at time *tg* produces no output since signal $\overline{M}$ is in the "0" binary condition resulting in a "0" binary condition being present in guard time. This is illustrated in curve R, FIG. 2.

As before signal R is coupled to the filter F for synchronization and to input circuit NC2. As before, circuit MD provides an output from AND gate 26 at the *ta* time slot of time slot *tg* for application to AND gates 25 and 27. Since the guard digit time slot has a "0" binary condition, AND gate 27 will produce an output to set flip flop V1 in its "1" condition resulting in a signal V being in binary condition "1" and signal $\overline{V}$ being in a binary condition "0." Flip flop B3 operates as before but regardless of the condition of flip flop B3 no output can appear from AND gates 28 and 29 since the signal $\overline{V}$ is in a "0" condition throughout the time duration of the code group Q2. However, AND gate 30 is activated by signal V and signal R to reproduce at the output of OR gate 31 the code group in signal R. Thus, signal G is identical to signal R, that is, there is no modification of the received code group as illustrated in curve R, FIG. 2.

The operation of the system of FIG. 1 will follow the same pattern as described hereinabove with respect to code group Q1 for the code groups Q3 and Q4. This is due to the fact that the transitions detected in code groups Q3 and Q4 are less than the given number N. Thus, the circuitry will operate substantially the same as described hereinabove with respect to Q1 in the production of signal R and the recovery of the NRZ code groups as indicated by signal G.

In summary detector TD, receives signal S1 and at a given digit time slots *tj* controls the setting of flip flop B1 in the "1" state at time *tb* through means of AND gate 11 which energizes AND gate 14. In a similar way, signal $\overline{S1}$ resets flip flop B1 to its "0" state by means of AND gate 12 which energizes AND gate 13. The output signals of AND gates 13 and 14 are passed through OR gate 15. AND gate 17 coupled to OR gate 15 is energized by the logical condition $(\overline{tg+t1})\times ta$ as provided from OR circuit 16 and inverter 32 and the timing signal *ta*. Thus, it may be stated that a signal *Co* appears in the basic time slot *ta* of the digit time slot $t(j+1)$ for each transition from "0" to "1" or from "1" to "0" when $J=2-8$, and that no signal *Co* appears when $j=0$ or 1. This means that for signal S1 (curve G, FIG. 2) account of the transitions which may occur on both sides of the guard time slot *tg* is not taken into account and, therefore, is equivalent to counting the number of transitions in the code group taken alone.

Counter CR which receives its advance signals from signal *Co* has its flip flops C1, C2 and C3 reset to "0" by signal *t*1. Where the number of transitions or pulses in signal *Co* is less than 4, that is, $N<4$, flip flop C3 is in the "0" state and where $N>3$, flip flop C3 is in the "1" state. It should be realized, however, that the value N may be selected to have other values with an accompanying modification of the counter. At the end of the time reserved to the reception of a code group, that is, at time *ta* of time *tg* in the next code group, one of AND circuits 18 and 19 of memory TM is energized according to whether the condition C or $\overline{C}$ is present and flip flop M1 is set to the "1" state or to the "0" state, respectively.

According to the conventions adopted hereinabove, signal M (M="1") is provided where $N>3$ and signal $\overline{M}$ (M="0") is obtained in the situation where $N<4$. These signals are processed by circuit TC including flip flop B2. Flip flop B2 is set to its "0" state at digit time *t*1 and in succeeding digit times it switches at basic time *ta* so that it is in the "0" state during the odd digit time slots and the "1" state during the even digit time slots. The logical expression for operation of circuit TC is as follows:

$$R=M\times S2+B2\times\overline{M}\times S2+B2\times\overline{M}\times S2+\overline{M}\times tg$$

When the logical condition $\overline{B2}\times M\times S2$ is present, the is transmitted directly as signal R by AND gate 20 and OR gate 24.

When the logical condition $\overline{B2}\times M\times S2$ is present, the odd digits are transmitted as signal R by AND gate 21 and OR gate 24.

When the logical condition $B2\times\overline{M}\times\overline{S2}$ is present, the even digits are transmitted as signal R in complemented form through AND gate 22 and OR gate 24.

When the logical condition $\overline{M}\times tg$ is present, a binary condition "1" is transmitted as signal R in the guard time through AND circuit 23 and OR circuit 24 ($\overline{M}$ must be in a binary condition "1").

In circuit MD, AND gate 26 delivers to AND gates 25 and 27 a control signal at time *ta* in time slot *tg*, that is at the beginning of the reception of the guard time. At this time either AND gate 27 is energized by signal $\overline{R}$ and controls the setting of the flip flop V1 in the "1" state, or AND gate 25 is energized by signal R and controls the setting of flip flop V1 in the "0" state.

Circuit CC comprises flip flop B3 controlled in the same manner as flip flop B2 by signals *t*1 and *ta* and in addition thereto AND gates 28, 29 and 30 and OR gate 31. This circuit supplies signal G which characterizes a digit "1" of the code group for the logical condition:

$$G=V\times R+\overline{V}\times R\times B3+\overline{V}\times\overline{R}\times\overline{B3}$$

This equation illustrates that a signal G (a "1" output) is obtained under the following conditions when there is received: (a) a digit "1" in R belonging to a code group wherein the guard digit or condition is "0," (b) a digit "1" in R located in an od digit time and belonging to a code group whose guard digit or condition is "1," and (c) a digit "0" in R located in an even digit position and belonging to a code combination whose guard digit or condtion is "1." In all other situations signal $\overline{G}$ is obtained, namely, a "0" binary condition. It is seen that circuit CC performs an operation which is the reverse to that carried out in circuit TC.

It has been seen in the above description that the transition detector TD counts the transitions in an isolated code group. More precisely, it does not take into account either a transition between *tg* and *t*1 which will occur if the digit at time *t*1 is in a "1" condition, or the transition between *t*8 and *tg* which will exist if the digit at time *t*8 is a "1" condition.

Under these conditions, the maximum number of transitions N*m* which may exist in a *n*-digit code group transmitted using NRZ modulation techniques is:

$$Nm=n-1$$

The system of this invention complements the digits of even number or time position for:

$$N\,\frac{n-p}{2}$$

In this N represents the number of transitions and P=0 if *n* is even, or P=1 if *n* is odd.

It is easily checked that the number of transitions in the modified code is then equal to $n-1-N$, without taking into account transitions which exist if the digit transmitted s *t*1 is a "0" and if the digit transmitted at the next time slot *tg* is different from that transmitted in time slot *t*8.

While we have described the principles of our invention in connection with specific apparatus, it is to be clearly understood that this description is made only by way of example and not as a limitation to the scope of our invention as set forth in the accompanying claims.

We claim:

1. A system for processing a train of a plurality of *n*-digit non-return-to-zero (NRZ) code groups having a guard time between adjacent ones of said NRZ code groups comprising:

a source of said NRZ code groups;

first means coupled to said source to produce a control signal for each of said NRZ code groups each of said control signals being dependent upon the number of transitions between the two binary conditions within the corresponding one of said NRZ code groups; and second means coupled to said source and said first means responsive to each of said control signals and the corresponding one of said NRZ code groups to convert each of said corresponding one of said NRZ code groups to a predetermined code group to a predetermined code group to produce a train of said predetermined code groups having a greater number of said transitions than said train of NRZ code groups to provide synchronization information for said train of predetermined code groups;

said first means including first logic circuit means to produce said control signal having one binary condition when the number of said transitions within one of said NRZ code groups is less than a given value and the other binary condition when the number of said transitions within one of said NRZ code groups is greater than said given value; and said second means including second logic circuit means responsive to said one condition of said control signal to complement even numbered digits of said one of said NRZ code groups to produce the corresponding one of said predetermined code groups and responsive to said other condition of said control signal to produce the corresponding one of said predetermined code groups which is identical to said one of said NRZ code groups.

2. A system according to claim 1, further including:

third means coupled to said second means responsive to said transitions of said train of predetermined code groups to extract said synchronization information; and fourth means coupled to said second means to convert each of said predetermined code groups to the corresponding one of said NRZ code groups.

3. A system according to claim 1, wherein said second logic circuit means further includes means responsive to said one condition of said control signal to produce said other binary condition in said guard time preceding said one of said NRZ code groups and responsive to said other condition of said control signal to produce said one binary condition in said guard time preceding said one of said NRZ code groups.

4. A system according to claim 3, further including third means coupled to said second means responsive to said transitions of said train of predetermined code groups to extract said synchronization information; and fourth means coupled to said second logic circuit means responsive to the binary condition present in said guard time preceding each of said predetermined code groups to convert each of said predetermined code groups to the corresponding one of said NRZ code groups.

5. A system for processing a train of a plurality of *n*-digit non-return-to-zero (NRZ) code groups having a guard time between adjacent ones of said NRZ code groups comprising:

a source of said NRZ code groups;

first means coupled to said source to produce a control signal for each of said NRZ code groups each of said control signals being dependent upon the number of transitions between the two binary conditions within the corresponding one of said NRZ code groups; and second means coupled to said source and said first means responsive to each of said control signals and the corresponding one of said NRZ code groups to convert each of said corresponding one of said NRZ code groups to a predetermined code group to produce a train of said predetermined code groups having a greater number of said transitions than said train of NRZ code groups to provide synchronization information for said train of predetermined code groups;

said first means including transition detector means coupled to said source producing an output pulse upon detection of a transition from the binary "1" condition to the binary "0" condition and upon detection of a transition from the binary "0" condition to the binary "1" condition, binary counting means coupled to said detector means to produce a first signal when said output pulses are less than a given value and a second signal when said output pulses are greater than said given value, and a first bistable means coupled to said counting means set during said guard time succeeding each of said NRZ code groups to provide said control signal having a binary "0" condition upon occurrence of said first signal and a binary "1" condition upon occurrence of said second signal.

6. A system according to claim 5, further including filter means coupled to said second means responsive to said transitions of said train of predetermined code groups to extract said synchronization information; and third means coupled to said second means to convert each of said predetermined code groups to the corresponding one of said NRZ code groups.

7. A system according to claim 5, wherein said second means includes a second bistable means activated to be in its "0" state during odd digit times and its "1" state during even digit times, delay means coupled to said source to delay said NRZ code groups by a time equal to the time of one of said NRZ code groups plus said guard time, first logic circuitry coupled to said first and second bistable means and said delay means to provide the delayed NRZ code group as the corresponding one of said predetermined code groups when said first bistable means is set in its "1" state and the delayed NRZ code group having its even digits inverted as the corresponding one of said predetermined code groups when said first bistable means is set in its "0' state, third means coupled to said firt bistable means activated during said guard time preceding the corresponding one of said predetermined code group to provide in said preceding guard time a "1" binary condition when said first bistable means is set in its "0" state and to provide in said preceding guard time a "0" binary condition when said first bistable means is set in its "1" state, and fourth means coupled to said first logic circuitry and said third means to provide said train of predetermined code groups.

8. A system according to claim 7, further including filter means coupled to said fourth means responsive to said transitions of said train of predetermined code groups to extract said synchronization information; and fifth means coupled to said fourth means responsive to the binary condition present in said guard time preceding each of said predetermined code groups to convert each of said predetermined code groups to the corresponding one of said NRZ code groups.

9. A system according to claim 8, wherein said fifth means includes a third bistable means activated to be in its "1" state during odd digit times and its "0" state during even digit times, guard digit detection means coupled to said fourth means to produce a third signal when said guard time includes a "1" binary condition and a fourth signal when said guard time includes a "0" binary condition, a fourth bistable means coupled to said guard digit detection means which is set in its "1" state when said fourth signal is present and is set in its "0" state when said third signal is present, and second logic circuitry coupled to said third and fourth bistable means and said fourth means to convert each of said predetermined code groups to the corresponding one of said NRZ code groups when said fourth signal is present and by inverting even digits of each said predetermined code groups when said third signal is present.

References Cited

UNITED STATES PATENTS

| | | | |
|---|---|---|---|
| 3,263,185 | 7/1966 | Lender | 325—38 |
| 3,387,213 | 6/1968 | Lender | 332—9 |
| 3,414,894 | 12/1968 | Jacoby | 340—347 |
| 3,448,445 | 6/1969 | Vallee | 340—347 |
| 3,422,425 | 1/1969 | Vallee | 340—347 |

MAYNARD R. WILBUR, Primary Examiner

J. GLASSMAN, Assistant Examiner

U.S. Cl. X.R.

325—38